United States Patent
Tauchi et al.

(10) Patent No.: US 8,302,022 B2
(45) Date of Patent: Oct. 30, 2012

(54) IN-VEHICLE DISPLAY APPARATUS

(75) Inventors: Makiko Tauchi, Kariya (JP); Takeshi Yamamoto, Anjo (JP); Nozomi Kitagawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 410 days.

(21) Appl. No.: 12/458,049

(22) Filed: Jun. 30, 2009

(65) Prior Publication Data

US 2010/0005412 A1    Jan. 7, 2010

(30) Foreign Application Priority Data

Jul. 2, 2008   (JP) ................................ 2008-173172

(51) Int. Cl.
- G06F 3/048   (2006.01)
- G06F 3/01    (2006.01)
- G06F 3/00    (2006.01)
- G06F 3/033   (2006.01)
- G06F 3/041   (2006.01)
- G09G 5/00    (2006.01)

(52) U.S. Cl. ........ 715/771; 715/701; 715/702; 715/721; 715/760; 715/856; 345/156; 345/161; 345/163; 345/167; 345/173; 345/179; 345/184

(58) Field of Classification Search .................. 715/721, 715/760, 701, 702, 856; 345/156, 161, 163, 345/167, 173, 179, 184

See application file for complete search history.

(56) References Cited

U.S. PATENT DOCUMENTS

| | | | |
|---|---|---|---|
| 6,707,421 B1* | 3/2004 | Drury et al. | 342/357.31 |
| 2002/0017988 A1* | 2/2002 | Irwin | 340/539 |
| 2004/0046751 A1 | 3/2004 | Heimermann et al. | |
| 2004/0155863 A1* | 8/2004 | Sakamaki et al. | 345/156 |
| 2004/0183779 A1* | 9/2004 | Shibazaki et al. | 345/157 |
| 2006/0095846 A1* | 5/2006 | Nurmi | 715/701 |
| 2006/0164389 A1* | 7/2006 | Ringot | 345/157 |
| 2007/0055423 A1* | 3/2007 | Yoshida et al. | 701/36 |
| 2007/0070033 A1* | 3/2007 | Guerraz et al. | 345/156 |
| 2009/0091432 A1* | 4/2009 | Koser et al. | 340/425.5 |

FOREIGN PATENT DOCUMENTS

| | | | |
|---|---|---|---|
| JP | 2003-061180 | * | 2/2003 |
| JP | 2004-224387 | * | 7/2003 |
| JP | A-2004-227387 | | 8/2004 |
| JP | A-2004-362428 | | 12/2004 |
| JP | A-2005-175815 | | 6/2005 |
| JP | 2007-302213 | * | 5/2006 |
| JP | A-2007-015502 | | 1/2007 |
| JP | A-2007-055561 | | 3/2007 |
| JP | A-2007-302213 | | 11/2007 |

OTHER PUBLICATIONS

Office Action mailed May 25, 2010 from the Japan Patent Office in the corresponding patent application No. 2008-173172 (and English translation).
Office Action mailed Jun. 15, 2012 in corresponding JP Application No. 2010-162794 (and English translation).

* cited by examiner

*Primary Examiner* — Boris Pesin
*Assistant Examiner* — Rinna Yi
(74) *Attorney, Agent, or Firm* — Posz Law Group, PLC

(57) ABSTRACT

An in-vehicle display apparatus includes (i) an operation device having an operation knob, and (ii) a display control device having a display section. The operation device has a drive section which gives force to the operation knob. When the display section displays a display window to enable a scroll display in which several selection buttons are circulated, the display control device acquires a reactive force map. The map specifies that a vibration is applied to the operation knob when the cursor is located on the selection button at the tail end of the series of the selection buttons in the display window. The display control device then instructs the drive section to apply the vibration to the operation knob based on the acquired reactive force map.

10 Claims, 5 Drawing Sheets

IN-VEHICLE DISPLAY APPARATUS

CROSS REFERENCE TO RELATED APPLICATION

The present application is based on and incorporates herein by reference Japanese Patent Application No. 2008-173172 filed on Jul. 2, 2008.

FIELD OF THE INVENTION

The present invention relates to an in-vehicle display apparatus provided with (i) an operation device including an operation knob which moves according to a user's operation and (ii) a display control device having a display section to display a display window.

BACKGROUND OF THE INVENTION

Patent document 1: JP-2005-175815 A

A conventional in-vehicle display apparatus such as a navigation apparatus is equipped with, as two different bodies, an operation device and a display control device having a display section. The display section displays a display window containing a series of several selection buttons, while the operation device remotely operates the selection buttons in the display window.

Further, Patent document 1 describes an input apparatus as follows. Several actuators are provided to an input means or a body of an electronic device. In response to an operation function or input processing degree, the several actuators are driven one by one in the time axis or the space axis to thereby vibrate the input means or the body of the electronic device. Thus, the operation function or the input processing degree can be fed back to a finger etc. as a haptic sense of the user.

In the above in-vehicle display apparatus or the navigation apparatus, it may be typical that a limited display screen contains various information. Thus, the display size of a switch button etc. is also apt to be designed to be small. This may cause a difficulty in recognizing a selection button or the like and then performing a selection operation.

In particular, the following may cause a difficulty. There is a display window containing a scroll display region in which several selection buttons can be displayed cyclically. When a scroll operation is performed in such a scroll display region, it is not easy to determine whether whole of the selection buttons is displayed cyclically or circulated completely. This may increase a time for a user to gaze at the display window.

Furthermore, there is another display window displaying a series of several set buttons aligned in a line. Such a display window may cause a difficulty in discerning which set button the cursor is presently located on. This may also increase a time for a user to gaze at the display window.

Furthermore, the input apparatus in Patent document 1 drives several actuators provided to the input means or the body of the electronic device; however, the selection buttons in the display window cannot be operated remotely using the actuators.

SUMMARY OF THE INVENTION

It is a first object of the present invention to provide a technology to shorten a time period for a user to gaze at a display window at a selection operation.

Further, the above in-vehicle display apparatus or the navigation apparatus has a function to notify that an event occurred by audio or display. It is determined that the event occurred when the recording process of music composition data is completed, or when the variety of information, such as traffic information, etc. are received from the outside etc., for instance.

In such a configuration, for example, when the audio volume is set to a mute state, the notification by audio cannot be performed; therefore, there is a problem for a user not to recognize the occurrence of the event.

It is thus a second object of the present invention to provide a technology to accurately perform a notification.

In order to achieve the first object, as an aspect of the present invention, an in-vehicle display apparatus is provided to comprise (i) an operation device including an operation knob which moves according to a user's operation and (ii) a display control device including a display section to display a display window. The in-vehicle display apparatus displays in the display section a cursor in association with a position of the operation knob, the cursor being used for selecting a selection button selectable in the display window. The operation device further includes a force applying section configured for applying force to the operation knob according to an instruction from the display control device. The display control device further includes a storage section and a force application instruction portion. The storage section is configured to store a map, the map specifying that, with respect to a display window containing a scroll display region in which a scroll display is enabled to circulate several selection buttons, a vibration is applied to the operation knob when the cursor is located on a top end selection button or a tail end selection button among the several selection buttons. The force application instruction portion is configured to obtain, from the storage section, the map corresponding to the display window displayed in the display section, and instruct the force applying section to apply a vibration to the operation knob when the cursor is located on the top end selection button or the tail end selection button based on the acquired map.

Such a configuration uses the map for specifying that the operation knob is vibrated when the cursor is located on the top end selection button or tail end selection button among the several selection buttons contained in the scroll display region. The display control device obtains the map from the storage section and instructs the force applying means or section to vibrate the operation knob when the cursor is located on the tail end or top end selection button based on the acquired map. The user can thus recognize that the cursor is located on the top end or tail end selection button by virtue of the vibration of the operation knob. This can shorten a time period necessary for the user to gaze at a display window at a selection operation.

As an optional aspect of the in-vehicle display apparatus, the map stored in the storage section may further specify that (i) when the cursor moves between the selection buttons displayed in the scroll display region, a reactive force is applied to the operation knob such that the cursor remains on one of the selection buttons before moving to an adjacent selection button of the selection buttons, and (ii) when the cursor moves in one direction over the several selection buttons, the reactive force applied to the operation knob is varied step by step along the one direction over the selection buttons. The force application instruction portion may be further configured to determine a vibration and a reactive force which is applied to the operation knob based on the map stored in the storage section and a display position of the cursor, and instruct the force applying section to apply the determined vibration and reactive force to the operation knob.

Under such a configuration, furthermore, when the cursor moves between selection buttons in one direction, the strength of the reactive force given to the operation knob changes step by step in the one direction. The user can thus also recognize the moving direction of the cursor based on the strength of the reactive force.

In addition, in order to achieve the first object, according to an aspect of the present invention, an in-vehicle display apparatus is provided to comprise (i) an operation device including an operation knob which moves according to a user's operation and (ii) a display control device including a display section to display a display window. The in-vehicle display apparatus displays in the display section a cursor in association with a position of the operation knob, the cursor being used for selecting a set button selectable in the display window. The operation device further includes a force applying section configured for applying force to the operation knob according to an instruction from the display control device. The display control device further includes a storage section and a force application instruction portion. The storage section is configured to store a map specifying that, with respect to a display window containing a set button display region where several set buttons including a maximum set button and a minimum set button are aligned in a line, a vibration is applied to the operation knob when the cursor is located on the minimum set button or the maximum set button. The force application instruction portion is configured to obtain, from the storage section, the map corresponding to the display window displayed in the display section, and instruct the force applying section to apply a vibration to the operation knob when the cursor is located on the minimum set button or the maximum set button based on the acquired map.

Under such a configuration, the display control device acquires from the storage section the map specifying the following. With respect to the display window containing the set button display region aligning in a line several set buttons including the minimum set button and the maximum set button, the operation knob is provided with the vibration when the cursor is located on the minimum set button or the maximum set button. Then, the display control device instructs the force applying means or section to vibrate the operation knob when the cursor is located on the minimum or maximum set button based on the acquired map. The user can thus recognize that the cursor is located, on the minimum or maximum set button by virtue of the vibration of the operation knob. This can, shorten a time period necessary for gazing at a display window at a selection operation.

As an optional aspect of the in-vehicle display apparatus, the map stored in the storage section may further specify that a vibration applied to the operation knob in case that the cursor is located on the maximum set button is larger than the vibration applied to the operation knob in case that the cursor is located on the minimum set button.

Under such a configuration, the vibration applied to the operation knob is larger in the case that the cursor is located on the maximum set button than in the case that the cursor is located on the minimum set button. The user can therefore recognize which set button, the minimum set button or the maximum set button, the cursor is presently located on, from the strength of the vibration of the operation knob.

As an option aspect of the in-vehicle display apparatus, the map stored in the storage section may further specify that when the cursor moves between the set buttons displayed in the set button display region, a reactive force is applied to the operation knob such that the cursor remains on one of the set buttons before moving to an adjacent set button of the set buttons. The force applying instruction portion may be further configured to determine a vibration and a reactive force which are applied to the operation knob based on the map stored in the storage section, and instruct the force applying section to apply the determined vibration and reactive force to the operation knob.

Under such a configuration, when the cursor moves between adjoining set buttons displayed in the display region, a reactive force is applied to the operation knob so as to try to cause the cursor to stop on the cursor-existing set button before the cursor moves to the adjacent set button. The user can also recognize whether the cursor has moved onto the different set button by virtue of the reactive force.

In addition, in order to achieve the first object, according to an example of the present invention, an in-vehicle display apparatus is provided to comprise (i) an operation device including an operation knob which moves according to a user's operation and (ii) a display control device including a display section to display a display window. The in-vehicle display apparatus displays in the display section a cursor in association with a position of the operation knob, the cursor being used for selecting a set button selectable in the display window. The operation device further includes a force applying section configured for applying force to the operation knob according to an instruction from the display control device. The display control device further includes a storage section and a force application instruction portion. The storage section is configured to store a map specifying that, with respect to a display window containing a set button display region to display a series of set buttons in a line, when the cursor moves over the series of set buttons contained in the set button display region in one direction, a strength of a vibration applied to the operation knob is varied step by step in the one direction over the set buttons. The force applying section is configured to obtain, from the storage section, the map corresponding to the display window displayed in the display section, and instruct the force applying section to change the strength of the vibration applied to the operation knob step by step in the one direction over the set buttons when the cursor moves over the series of set buttons contained in the set button display region in the one direction.

Under such a configuration, the display control device acquires the map specifying that when the cursor moves in one direction over a series of set buttons contained in the set button display region, the strength of the vibration applied to the operation knob is varied step by step along the one direction. When the cursor moves along the series of set buttons contained in the set button display region in one direction, the display control device instructs the force applying means or section to apply the vibration to the operation knob such that the strength of the vibration is varied step by step in the one direction along the set buttons, based on the acquired map. The user can recognize the moving direction of the cursor from the strength of the vibration applied to the operation knob. This can shorten a time period necessary for gazing at a display window at a selection operation.

As an optional aspect of the in-vehicle display apparatus, the map stored in the storage section may further specify that, when the cursor moves between the set buttons displayed in the set button display region, a reactive force is applied to the operation knob such that the cursor remains on one of the set buttons before moving to an adjacent set button of the set buttons. The force applying instruction portion may be further configured to determine a vibration and a reactive force which are applied to the operation knob based on the map stored in the storage section, and instruct the force applying section to apply the determined vibration and reactive force to the operation knob.

Under such a configuration, when the cursor moves between adjoining set buttons displayed in the display region, a reactive force is applied to the operation knob so as to try to cause the cursor to stop on the cursor-existing set button before the cursor moves to the adjacent set button. The user can also recognize whether the cursor has moved onto the different set button by virtue of the reactive force.

In addition, in order to achieve the second object, according to an aspect of the present invention, an in-vehicle display apparatus is provided to comprise (i) an operation device including an operation knob which moves according to a user's operation, and (ii) a display control device including a display section to display a display window. The in-vehicle display apparatus displays in the display section a cursor in association with a position of the operation knob, the cursor being used for selecting a selection button selectable in the display window. The in-vehicle display apparatus has a function to determine that a predetermined event occurred to thereby notify that the event occurred by performing an audio output using a speaker. The operation device further includes a force applying section configured for applying a reactive force to the operation knob according to an instruction from the display control device. The display control device further includes an audio output setting determination portion and a notification control portion. The audio output setting determination portion is configured to determine whether the audio output using the speaker is set to a prohibition state where the audio output is prohibited. The notification control portion is configured, when determining that the event occurred and that the audio output is set to the prohibition state, to instruct the force applying section to vibrate the operation knob to thereby notify that the event occurred.

Under such a configuration, when the display control device determines that the above event occurred and the speaker is set to the state to prohibit audio output, the display control device instructs the force applying means or section to vibrate the operation knob to thereby notify a user of the event having occurred. Thus, the event can be reported more certainly.

In addition, in order to achieve the second object, according to an aspect of the present invention, an in-vehicle display apparatus is provided to comprise (i) an operation device including an operation knob which moves according to a user's operation, and (ii) a display control device including a display section to display a display window. The in-vehicle display apparatus displays a cursor in the display window in association with a position of the operation knob. The operation device further includes a force applying section configured for applying a reactive force to the operation knob according to an instruction from the display control device. The display control device further includes a notification control portion configured, when information transmitted from an outside is received, to instruct the force applying section to apply a vibration to the operation knob to thereby notify that the information transmitted from the outside is received.

Under such a configuration, when the information transmitted from the outside is received, the display control device instructs the force applying means or section to vibrate the operation knob to thereby notify a user that information is received. Thus, the event can be reported more certainly.

As an optional aspect, the in-vehicle display apparatus may further comprise an information type determination portion configured, when the notification control portion receives the information transmitted from the outside, to determine a type of the received information. The notification control portion may be further configured, based on the type of the information determined by the information type determination portion, to instruct the force applying section to vary a vibration which is applied to the operation knob.

Under such a configuration, the vibrating applied to the operation knob is varied based on the types of the received information. The user can recognize the types of the received information by virtue of the vibration of the operation knob.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
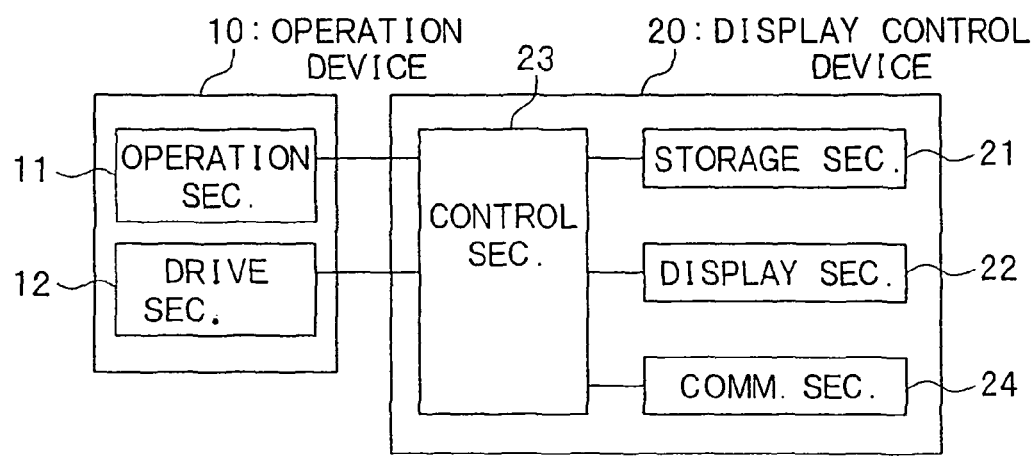
FIG. 1 is a diagram illustrating a configuration of an in-vehicle display apparatus according to a first embodiment of the present invention.

A configuration of an in-vehicle display apparatus according to a first embodiment of the present invention is illustrated in FIG. 1. The present in-vehicle display apparatus functions as an in-vehicle navigation apparatus mounted in a subject vehicle. The present in-vehicle display apparatus includes an operation device 10 and a display control device 20. The operation device 10 is provided in a center console of the vehicle. The display control device 20 is provided in an instrument panel of the vehicle.

Figure 2A:
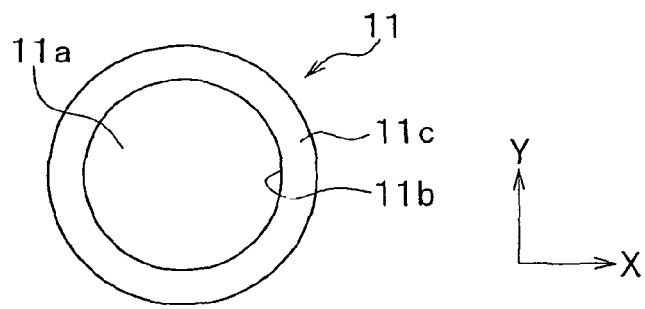
FIGS. 2A, 2B are a top view and a side view of an operation section.
Figure 2B:
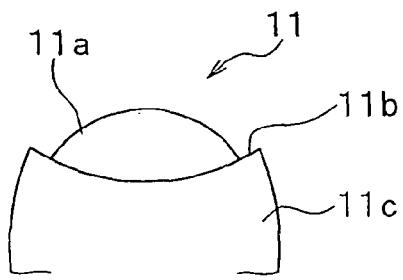

The operation device 10 is provided with an operation section 11 and a drive section 12. An outline structure of the operation section 11 is illustrated in FIGS. 2A, 2B. FIG. 2A is a top view of the operation section 11 and FIG. 2B is a side view of the upper part of the operation section 11.

The operation section 11 includes (i) a holder 11c shaped of an approximately hemisphere and (ii) an operation knob 11a shaped of a hemisphere. The holder 11c has an opening 11b shaped of an approximately circle in the top portion of the holder 11c. The operation knob 11a is enveloped partially and supported by the holder 11c. The operation knob 11a turns according to user operations in an operation plane in the directions of X-axis and Y-axis, as shown in FIG. 2A. In addition, the operation section 11 has a detection circuit (not shown) which detects a position of the operation knob 11a. The detection circuit outputs a position signal indicating as an absolute position the position (X coordinates, Y coordinates) of the operation knob 11a to the display control device 20.

The present operation device 10 is configured as a so-called haptic controller that gives a reactive force including a thrust to the operation knob 11a according to the operation state.

The drive section 12 includes several actuators, which give a reactive force to the operation knob 11a, and an actuator, which causes the operation knob 11a to generate vibration (none shown). The drive section 12 drives each actuator according to instruction signals from the control section 23 to thereby apply a reactive force in an optional direction to the operation knob 11a and/or vibrate the operation knob 11a. Furthermore, the operation load of the operation knob 11a can be increased by giving the operation knob 11a a reactive force in the direction opposite to the direction of the user operation. In contrast, the operation load of the operation knob 11a can be decreased by giving the operation knob 11a a reactive force in the same direction as the direction of the user operation.

In addition, the display control device 20 is provided with a storage section 21, a display section 22, a control section 23, and a communication section 24. The communication section 24 can communicate with an outside of the in-vehicle display apparatus.

The storage section 21 has a nonvolatile storage medium such as a hard disk drive to store the various data. The storage section 21 stores a reactive force map mentioned later, map data for map display or route retrieval, and a program executed by the control section 23.

The display section 22 displays the various display windows according to display data or instruction signal inputted from the control section 23.

The control section 23 includes a computer having a known CPU, memory, I/O, etc.; the CPU executes several processes according to a relevant program stored in the memory.

The processes of the control section 23 include displaying, in the display section 22, the various display windows and a cursor, which is used for selecting a selection button selectable in a display window, in association with or in conjunction with a position of the operation knob 11a.

The storage section 21 according to the present embodiment stores in association with each other (i) display data for displaying various display windows and (ii) window IDs for identifying-respective display windows, which include a map display window, a retrieval processing window, a air-conditioner setting window, an audio setting window, and a navigation window.

Furthermore, the storage section 21 further stores a reactive force map, which specifies a reactive force applied to the operation knob 11a, in association with each of the above window IDs. The reactive force map specifies reactive forces as follows. A predetermined display window contains a scroll display region in which several selection buttons can be displayed cyclically or circulated. When a cursor is located on the top end selection button or the tail end selection button among the above several selection buttons, vibration is applied to the operation knob 11a. Further, when the cursor moves between adjoining selection buttons displayed in the scroll display region, a reactive force is applied to the operation knob 11a so as to try to cause the cursor to stop on a cursor-existing selection button, on which the cursor is presently existing, before the cursor moves to the selection button adjacent to the cursor-existing selection button. Yet further, when the cursor moves over the selection buttons in one direction, a reactive force is applied to the operation knob 11a so as to change the quantity or strength of the reactive force gradually or step by step along the one direction.

The control section 23 acquires, from the storage section 21, a reactive force map corresponding to a display window displayed on the display section 22. The control section 23 determines vibration and reactive force which are applied to the operation knob 11a based on the acquired reactive force map and the display position of the cursor. The control section 23 thereby executes a process to instruct the drive section 12 to apply the determined vibration and reactive force to the operation knob 11a.

Figure 3:
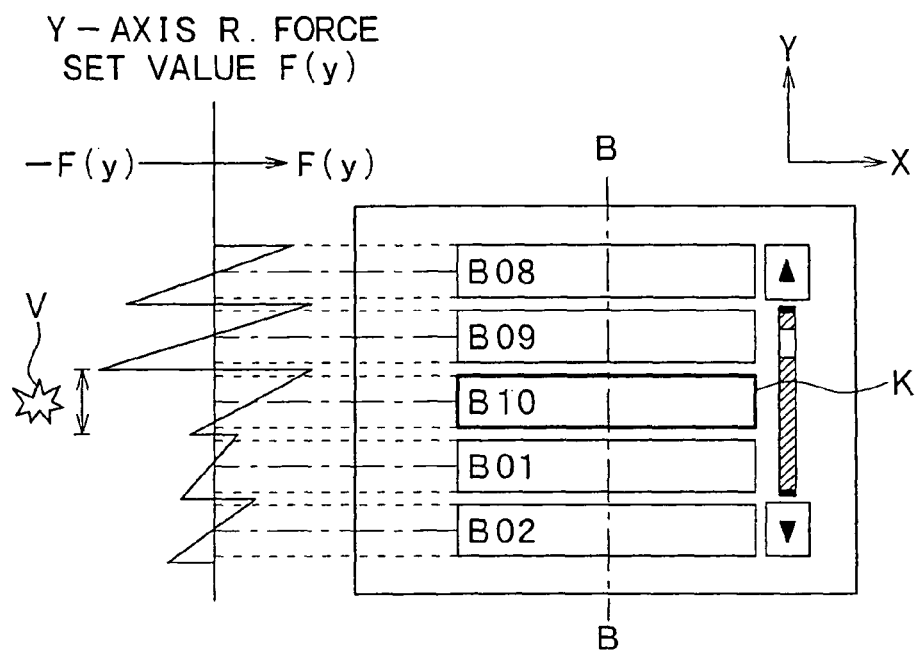
FIG. 3 is a diagram explaining a reactive force map according to the first embodiment.

More specifically, the reactive force map is explained with reference to FIG. 3. FIG. 3 includes a display window containing a scroll display region in which several selection buttons can be cyclically scrolled. Although only the selection buttons B08 to B10, B01, and B02 are displayed in FIG. 3, all the selection buttons B01 to B10 can be displayed using the scroll operation. Furthermore, the selection buttons B08 to B10, B1, and B2 shown in the scroll display region include numerals, Japanese characters, or alphabets in fact, and they are displayed in the numeral order, the Japanese character order, or alphabetically. Furthermore, the selection button B01 indicates the top end selection button whereas, the selection button B10 indicates the tail end selection button. In addition, FIG. 3 shows the display window in which a cursor K is located on the tail end selection button B10. In addition, the left portion of FIG. 3 illustrates a reactive force setting value (also referred to as Y-axis reactive force set value) of each part along the B-B line in the display window.

More specifically, in the Y-axis reactive force set value, the force applied downward is indicated with + (plus) while the force applied upward is indicated with − (minus). In contrast, in the X-axis reactive force set value, the force applied rightward is indicated with + (plus) while the force applied leftward is indicated with − (minus). Each reactive force is designed to be applied toward the center of the button. Thus, with respect to the Y-axis reactive force set value F (y), the value is set to zero approximately at the central portion on each selection buttons B08, B09, B01, and B02 although with respect to the tail end selection button B10 the value is set to zero at a portion below the central portion. Further, the value is set to positive (plus) value approximately in the upper half portion on each selection button B08 to B10, B01, and B02 displayed in the display window; the value is set to negative (minus) value approximately in the lower half portion on each selection button B08 to B10, B01, and B02. This signifies the following. When trying to move upward the cursor from the position just on each selection button B08 to B10, B01, and B02 to the upper adjoining selection button B08 to B10, B01, and B02, the reactive force is applied such that the cursor K is forced to move downward (the direction of −Y), i.e., the reactive force is applied to move the operation knob 11a closer to the user or operator of the operation knob 11a. When trying to move downward the cursor from the position just on each selection button B08 to B10, B01, and B02 to the lower adjoining selection button B08 to B10, B01, and B02, the reactive force is applied such that the cursor K is forced to move upward (the direction of +Y), i.e., the reactive force is applied to move the operation knob 11a farther from the operator of the operation knob 11a. That is, when the cursor K moves between the respective selection buttons, the reactive force is applied to the operation knob 11a such that the cursor K tries to remain on the selection button before the cursor separates therefrom. In addition, the strength or amount of the Y-axis reactive force set value F (y) is set as follows. The reactive force is set to the minimum value in the position on the top end selection button B01 while set to the maximum value in the position on the tail end selection button B10. Further, the reactive force is increased from the position on the selection button B01 to the position on the selection button B10 step by step. This signifies that the reactive force is applied to the operation knob 11*a* such that the strength of the reactive force increases gradually as the cursor K moves over the several selection buttons in the ascending order.

In addition, in FIG. 3, a vibrating mark V is illustrated at the position corresponding to the tail end selection button B10. The vibrating mark V indicates an instruction to vibrate the operation knob 11*a*. This signifies that the reactive force map specifies vibrating the operation knob 11*a* when the cursor K is located on the tail end selection button B10.

The reactive force map described above is stored in the storage section 23 in association with the window ID of the display window displayed in the display section 21.

The control section 23 determines vibration and reactive force which are applied to the operation knob 11*a* based on the reactive force map and the display position of the cursor K. The control section 23 thereby executes a process to instruct the drive section 12 to apply the determined vibration and reactive force to the operation knob 11*a*.

In the in-vehicle display apparatus according to the present embodiment, when the display section 22 is caused to display a predetermined display window containing a scroll display region in which several selection buttons can be displayed cyclically, the user is informed that one cycle of all the selection buttons is completed by vibrating the operation knob 11*a*. At the same time, the user is informed of the direction in which the cursor is moving over the several selection buttons by applying the reactive force to the operation knob 11*a*.

Figure 4:
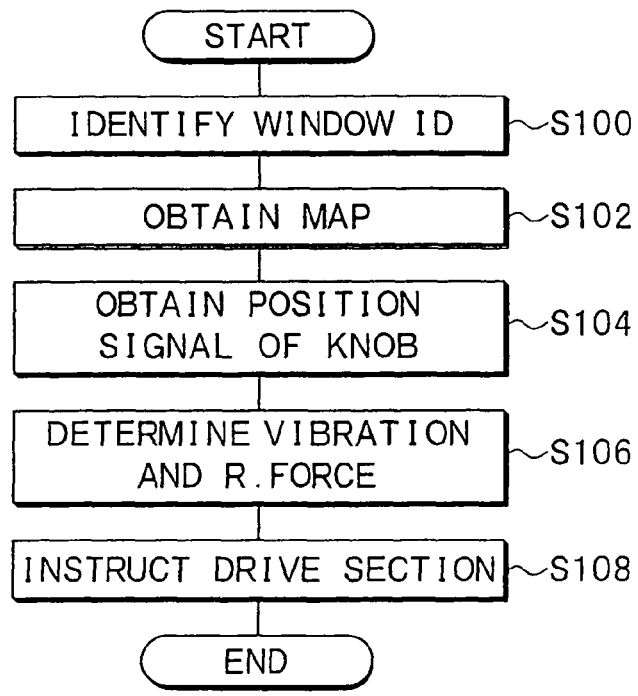
FIG. 4 is a flowchart illustrating a process executed by a control section according to first to third embodiments of the present invention.

Next, a process by the control section 23 is explained with reference to FIG. 4. The present in-vehicle display apparatus is turned into an operation state when the ignition switch of the vehicle turns on. The control section 23 then executes a process illustrated in FIG. 4 while displaying the respective display windows in the display section 22.

First, at S100, the control section 23 identifies the display window ID corresponding to the display window displayed in the display section 22. In the present embodiment, while displaying in the display section 22 the display window illustrated in FIG. 3, the display window ID matching with the display window is read from the storage section 21 and identified.

Next, at S102, the reactive force map corresponding to the display window ID is acquired. In detail, the reactive force map corresponding to the display window ID is acquired from the storage section 21. As illustrated in the Y-axis reactive force set value in FIG. 3, the reactive force map specifies the following. First, FIG. 3 includes the display window having a scroll display region in which the several selection buttons can be scrolled cyclically. When the display position of the cursor K is on the tail end selection button B10, the vibration is applied to the operation knob 11*a*. When the cursor K moves between the selection buttons displayed in the scroll display region, the reactive force is applied to the operation knob 11*a* such that the cursor tries to remain on the selection button before moving to the adjacent selection button. Yet further, when the cursor moves over and between the selection buttons in one direction, the reactive force is applied to the operation knob 11*a* so as to change the quantity or strength of the reactive force gradually or step by step along the one direction over the several selection buttons.

Next, at S104, the position signal showing the position of the operation knob 11*a* is acquired from the operation device 10.

Next, at S106, the vibration and reactive force applied to the operation knob 11*a* are determined. In detail, the display position of the cursor K displayed in the display window is determined based on the position signal showing the position of the operation knob 11*a*. The direction and strength of the reactive force and the vibration applied to the operation knob 11*a* are also determined based on the reactive force map.

Next, at S108, the control section 23 instructs the drive section 12 to apply the determined vibration and reactive force, and the processing once ends. Thereby, the vibrating and reactive force can be applied to the operation knob 11*a* according to the display position of the cursor K. Furthermore, the user can move the cursor K up to a desired selection button by operating the operation knob 11*a* with an operation load or force greater than the reactive force applied to the operation knob 11*a*. In addition, the operation load of the operation knob 11*a* is greater as the reactive force applied to the operation knob 11*a* is greater. In contrast, the operation load of the operation knob 11*a* is less as the reactive force applied to the operation knob 11*a* is less.

Suppose a case that a user operates the operation knob 11*a* to move the display position of the cursor K from the position on the selection button B08, via the position on the selection button B09, and to the position on the selection button B10. In such a case, The strength of the reactive force applied to the operation knob 11*a* becomes large step by step to sense that the operation load becomes heavy step by step. Further, when the display position of the cursor K comes on the top end selection button B01, the strength of the reactive force applied to the operation knob 11*a* becomes minimum to sense that the operation load becomes rapidly light. Furthermore, when the operation knob 11*a* is operated so that the display position of the cursor K moves over the selection buttons in the ascending order from B01 to B10, the strength of the reactive force applied to the operation knob 11*a* becomes large step by step to sense that the operation load becomes heavy gradually. Thus, when the operation knob 11*a* is operated such that the display position of the cursor K moves over the selection buttons in one direction corresponding to the ascending order, the strength of the reactive force applied to the operation knob 11*a* becomes large step by step to sense that the operation load becomes heavy step by step.

In addition, when the display position of the cursor K comes on the tail end selection button B10, the operation knob 11*a* vibrates; thus, the user can easily recognize that the cursor K is located on the tail end selection button B10.

According to the above-mentioned configuration of the present embodiment, the display control device 20 acquires from the storage section 21*a* map specifying that the operation knob 11*a* is vibrated when the cursor K is located on the tail end selection button B10 among the several selection buttons B01 to B10 contained in the scroll display region. Thus, the display control device 20 instructs the drive section 12 to vibrate the operation knob 11*a* when the cursor is located on the tail end selection button B10 based on the acquired map. The user can recognize that the cursor K is located on the tail end selection button B10 by virtue of the vibration of the operation knob 11*a*. This can shorten a time period necessary for gazing at a display window at a selection operation.

Yet further, when the cursor moves over the several selection buttons in one direction, the strength of the reactive force given to the operation knob 11*a* changes step by step along the one direction. The user can also recognize the moving direction of the cursor based on the strength of the reactive force.

In the present embodiment, the storage section 21 stores a map specifying that the operation knob 11*a* is vibrated when perching on the tail end selection button B10 among the several selection buttons contained in the scroll display region; and the operation knob 11*a* is vibrated when the cursor K is located on the tail end selection button B10. In contrast, for example, the storage section 21 may store a map specifying that the operation knob 11a is vibrated when the cursor is located on the top end selection button B01 among the several selection buttons B01 to B10 contained in the scroll display region; and the operation knob 11a may be vibrated when the cursor K is located on the top end selection button B01.

Second Embodiment

The configuration of the in-vehicle display apparatus according to a second embodiment of the present invention is the same as that illustrated in FIG. 1. The process of the control section 23 is also the same as the process illustrated in FIG. 4. As compared with the in-vehicle display apparatus according to the first embodiment, the in-vehicle display apparatus according to the present second embodiment has a difference in (i) the display window displayed on the display section 22 and (ii) the reactive force map.

In the In-vehicle display apparatus according to the present embodiment, the display section 22 displays an air-conditioner display window containing a series of several set buttons for setting up the air quantity of the air-conditioner. The several set buttons include a minimum set button, in which the setting value of the air quantity is set to minimum, and a maximum set button, in which the setting value of the air quantity is set to maximum. The operation knob 11a is provided with the vibration when the cursor is located on the minimum set button or the maximum set button. Yet further, when the cursor moves over several set buttons, the operation knob 11a is provided with the reactive force such that the cursor tries to remain on a set button before moving to an adjacent set button.

Figure 5:
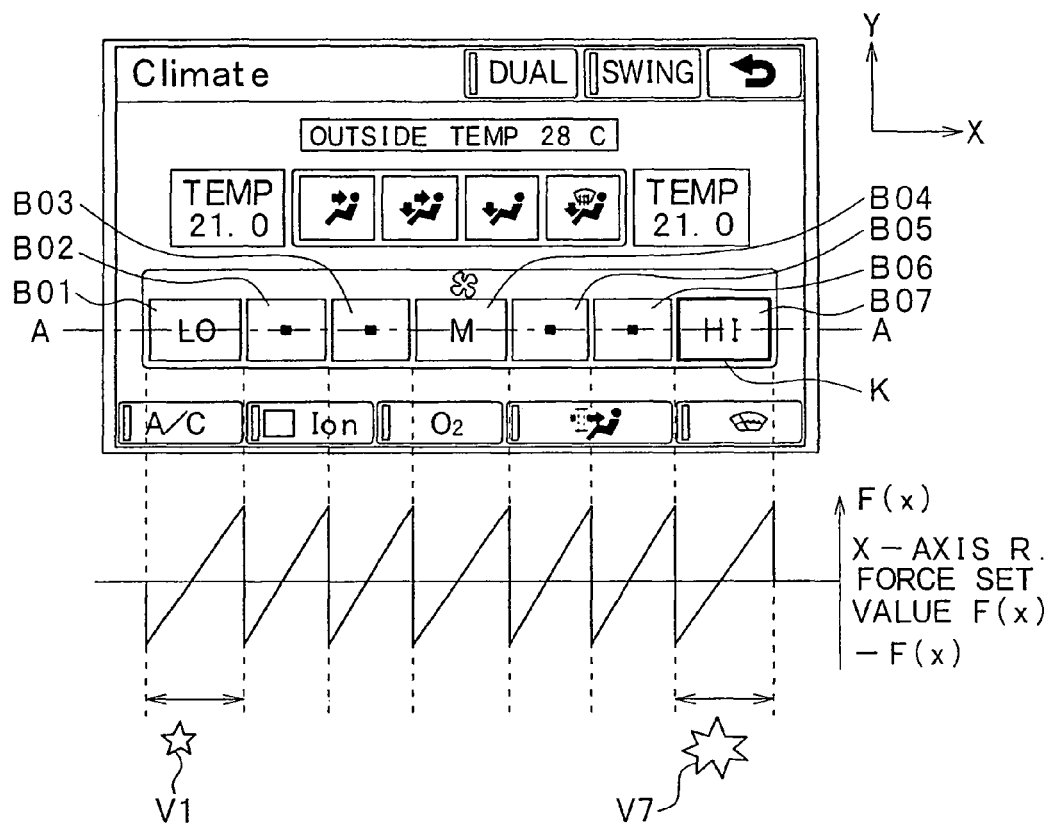
FIG. 5 is a diagram explaining a reactive force map according to a second embodiment of the present invention.

FIG. 5 illustrates a display example of such a air-conditioner setting window. The air-conditioner setting window contains a set button display region displaying to align several set buttons B01 to B07 in a row for setting the air quantity of the air-conditioner. For instance, the set button B01 is the minimum set button while the set button B07 is the maximum set button. In addition, the lower portion of FIG. 5 illustrates a reactive force setting value (also referred to as X-axis reactive force set value) of each part along the A-A line in the display window.

In the X-axis reactive force set value F(x), the value is set to negative (minus) in the left half portion on each set button B01 to B07 displayed in the air-conditioner setting window; and the value is set to positive (plus) value in the right half portion on each set button B01 to B07. The value is set to zero in the central portion on each set button B01 to B07. When the cursor K is moved from the set button B01 to the set button B02 positioned on the right-hand side of the set button B01, for example, the reactive force is applied such that the cursor K is forced to move leftward (the direction of −X), i.e., such that the operation knob 11a is forced to move leftward. When trying to move leftward the cursor K from the position just on the set button B02 to the left adjoining set button B01, the reactive force is applied such that the cursor K is forced to move rightward (the direction of +X), i.e., such that the operation knob 11a is forced to move rightward. That is, when the cursor K moves between the respective set buttons, the reactive force is applied to the operation knob 11a such that the cursor K tries to remain on the set button before the cursor separates therefrom. In addition, the strength of Y-axis reactive force set value F (y) is constant.

In addition, in FIG. 5, a small-sized vibrating mark V1 indicating an instruction to vibrate the operation knob 11a is illustrated at the position corresponding to the minimum set button B01. In contrast, a large-sized vibrating mark V7 also indicating an instruction to vibrate the operation knob 11a is illustrated at the position corresponding to the set button B07. This signifies the following. The operation knob 11a is vibrated small when the cursor K is located on the minimum set button B01; and the operation knob 11a is vibrated large when the cursor K is located on the maximum set button B07. In other words, the reactive force map specifies that the operation knob 11a is vibrated small when the cursor K is located on the minimum set button B01 and vibrated large when the cursor K is located on the maximum set button B07.

Therefore, when the operation knob 11a is operated such that the display position of the cursor K is located on the set button B01, the operation knob 11a is vibrated small. Each time the operation knob 11a is operated such that the display position of the cursor K is located on each of the set buttons from B02 to B06 in series, the operation knob 11a receives the reactive force. It is thus sensed that a given operation load is applied to the operation knob 11a. Then, when the operation knob 11a is operated such that the display position of the cursor K is located on the set button B07, the operation knob 11a is vibrated large. Thus, when the operation knob 11a is operated such that the display position of the cursor K moves over the set buttons in one direction, the reactive force having a fixed strength is given to the operation knob 11a. Further, as explained above, the operation knob 11a is vibrated small when the cursor K is located on the minimum set button B01 and vibrated large when the cursor K is located on the maximum set button B07. The user can easily recognize, by the vibration of the operation knob 11a, that the pointing position of the operation knob 11a is located on the minimum set button B01 or the maximum set button B07.

According to the above-mentioned configuration of the second embodiment, the display control device 20 acquires from the storage section 21 the map specifying the following. With respect to the display window containing the set button display region aligning in a line several set buttons including the minimum set button and the maximum set button, the operation knob 11a is provided with the vibration when the cursor K is located on the minimum set button or the maximum set button. Further, the display control device 20 instructs the drive section 12, which functions as a bias means or section or a force applying means or section, to vibrate the operation knob 11a when the cursor is located on the minimum or maximum set button based on the acquired map. The user can thus recognize that the cursor is located on the minimum or maximum set button by virtue of the vibration of the operation knob 11a. This can shorten a time period necessary for gazing at a display window at a selection operation.

In addition, the reactive force map further specifies that the vibration applied to the operation knob 11a is larger in the case that the cursor is located on the maximum set button than in the case that the cursor is located on the minimum set button. Thus, the vibration applied to the operation knob 11a is larger in the case that the cursor is located on the maximum set button than in the case that the cursor is located on the minimum set button. The user can therefore recognize which set button, the minimum set button or the maximum set button, the cursor is presently located on from the strength of the vibration of the operation knob 11a.

Further, the reactive force map specifies that when the cursor moves between adjoining set buttons displayed in the set button display region, a reactive force is applied to the operation knob 11a so as to try to cause the cursor to stop on a cursor-existing set button, on which the cursor is presently existing, before the cursor moves to the set button adjacent to the cursor-existing set button. When the cursor moves over the set buttons or between adjoining set buttons displayed in the display region, a reactive force is applied to the operation knob 11a so as to try to cause the cursor to stop on the cursor-existing set button before the cursor moves to the adjacent set button. The user can also recognize whether the cursor K has moved onto the different set button by virtue of the reactive force.

The present second embodiment explains the case where several set buttons for setting up the air quantity of the air-conditioner contained in the air-conditioner display window are operated. In contrast, the present embodiment need not be limited to the case when the set buttons contained in such a display window are operated. For example, it can be applied to the case when the volume set buttons etc. which are contained in the audio display window, are operated.

Third Embodiment

The configuration of the in-vehicle display apparatus according to a third embodiment is the same as that illustrated in FIG. 1. The process of the control section 23 is also the same as the process illustrated in FIG. 4. As compared with the in-vehicle display apparatus according to the first or second embodiment, the in-vehicle display apparatus according to the present third embodiment has a difference in (i) the display window displayed on the display section 22 and (ii) the reactive force map.

In the in-vehicle display apparatus concerning the present embodiment, with respect to an air-conditioner display window displayed in the display section 22, when the cursor K moves in one direction over a series of the several set buttons for setting up the air quantity of the air-conditioner, the vibration is applied to the operation knob 11a so as to change the quantity or strength of the vibration gradually or step by step along the one direction. Further, when the cursor moves between adjoining set buttons, the reactive force is applied to the operation knob 11a so as to try to cause the cursor K to try to stop on the cursor-existing set button before the cursor moves to the adjacent set button.

Figure 6:
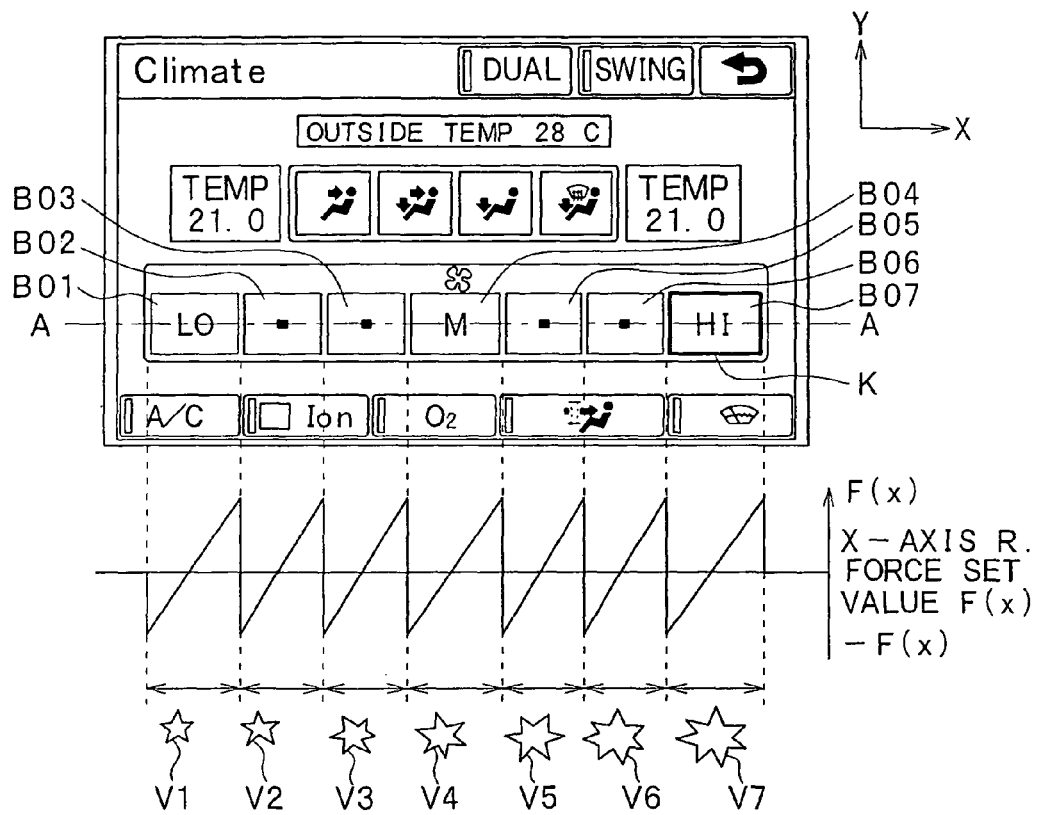
FIG. 6 is a diagram explaining a reactive force map according to a third embodiment of the present invention.

FIG. 6 illustrates a display example of the air-conditioner setting window. The air-conditioner setting window contains a set button display region displaying to align several set buttons B01 to B07 in a row for setting the air quantity of the air-conditioner. In addition, the lower portion of FIG. 6 illustrates a reactive force setting value (also referred to as X-axis reactive force set value) of each part along the A-A line in the display window.

In similarity with FIG. 5 of the second embodiment, in the X-axis reactive force set value F(x), the value is set to negative (minus) in the left half portion on each set button B01 to B07 displayed in the air-conditioner setting window; the value is set to positive (plus) value in the right half portion on each set button B01 to B07; and the value is set to zero in the central portion on each set button B01 to B07. That is, when the cursor K moves over the respective set buttons, the reactive force is applied to the operation knob 11a such that the cursor K tries to remain on each set button before the cursor separates therefrom.

In addition, in FIG. 6, a small-sized vibrating mark V1 indicating an instruction to vibrate the operation knob 11a is illustrated at the position corresponding to the minimum set button B01. In contrast, a large-sized vibrating mark V7 indicating an instruction to vibrate the operation knob 11a is illustrated at the position corresponding to the set button B07. In addition, vibrating marks V2 to V6 are illustrated in the position corresponding to the set buttons B02 to B06, respectively. Furthermore, the strength of each vibrating mark becomes large gradually as the cursor K proceeds from the vibrating mark V1 to the vibrating mark V7 from left to right. This signifies the following. The operation knob 11a is vibrated small when the cursor K is located on the minimum set button B01. The strength of the vibration applied to the operation knob 11a is increased gradually as the display position of the cursor K proceeds from the set button B02 via the set buttons B03 to B05 to the maximum set button B07. Thus, the reactive force map specifies that the small quantity of the vibration is applied to the operation knob 11a when the cursor K is located on the minimum set button B01, and the strength of the vibration applied to the operation knob 11a is increased gradually as the display position of the cursor K proceeds from the set button B02 via the set buttons B03 to B05 to the maximum set button B07.

Therefore, use of such a reactive force map enables the following. When the operation knob 11a is operated such that the display position of the cursor K is located on the set button B0, the operation knob 11a is vibrated small. Each time the operation knob 11a is operated such that the display position of the cursor K is located on each of the set buttons B02 to B06 in series from B02 to B06, the operation knob 11a receives the reactive force. Furthermore, the operation knob 11a receives the vibration, which increases step by step as proceeding the set buttons from B02 to B06. Therefore, the vibration given to the operation knob 11a becomes large gradually as the display position of the cursor K moves along the set buttons in ascending order. The user can recognize that the display position of the cursor K moves along the set buttons in ascending order from the vibration given to the operation knob 11a.

According to the above-mentioned configuration, the display control device 20 acquires the map specifying that when the cursor moves along a series of set buttons contained in the set button display region in one direction, the strength of the vibration applied to the operation knob 11a is varied step by step along the one direction. When the cursor moves along a series of set buttons contained in the set button display region in one direction, the display control device 20 instructs the drive section 12 to apply the vibration to the operation knob 11a such that the strength of the vibration is varied step by step along the set buttons, based on the acquired map. The user can recognize the moving direction of the cursor K from the strength of the vibration applied to the operation knob 11a. This can shorten a time period necessary for gazing at a display window at a selection operation.

In addition, the reactive force map further specifies that when the cursor K moves within the several set buttons displayed in the set button display region, the operation knob 11a is provided with the reactive force such that the cursor K tries to remain on each set button before moving to the adjacent set button. When the cursor K moves between adjoining set buttons displayed in the display region, a reactive force is applied to the operation knob 11a so as to try to cause the cursor to stop on the cursor-existing set button before the cursor moves to the adjacent set button. The user can also recognize whether the cursor K has moved onto the different set button by virtue of the reactive force.

Fourth Embodiment

In a fourth embodiment, the in-vehicle display apparatus has an audio function, which executes playback and recording of music composition data, a communication function for accessing the Internet, etc, and a notification function. In the notification function, when it is determined that a previously defined event occurred, the event having occurred is notified by outputting audio via a speaker (not shown). Such an event occurs, for instance, when the recording of the music composition data using the audio function is completed, or when download of the various data using the communication function is completed. In addition, when the control section 23 determines that the above event occurs and the speaker is set to the state to prohibit audio output, the control section 23 executes a process to report the occurrence of the event by generating the vibration to the operation knob 11*a*.

Figure 7:
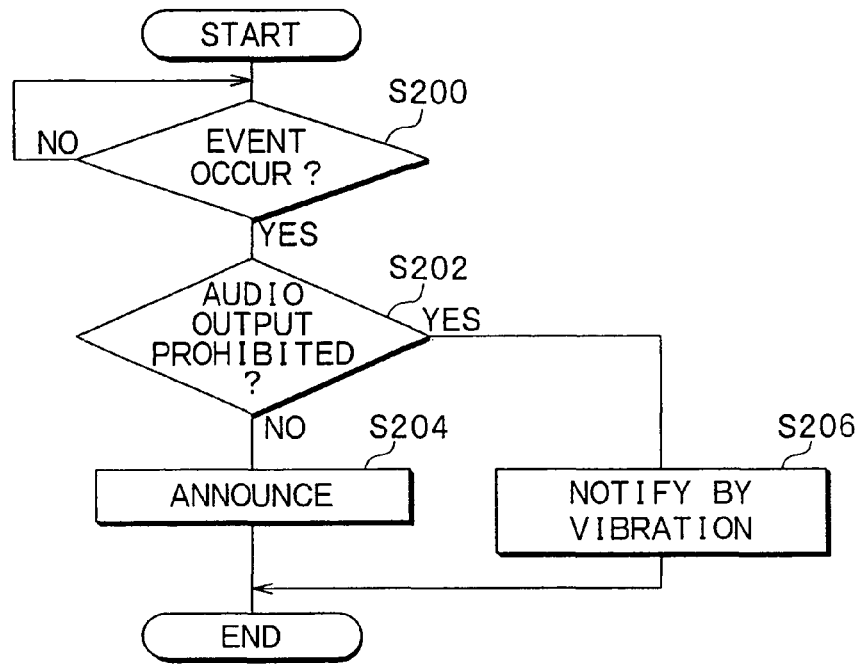
FIG. 7 is a flowchart illustrating a process executed by a control section according to a fourth embodiment of the present invention.

FIG. 7 illustrates a flowchart executed by the control section 23 concerning the present embodiment. When the ignition switch of the vehicle turns on and the control section 23 is thereby moved to an operation state, the control section 23 starts a process illustrated in FIG. 7.

First, at S200, it is determined whether the event occurred or not. More specifically, it is determined whether a predetermined event occurred or not. For instance, such a predetermined event occurs when the recording of the music composition data using the audio function is completed, or when the download of the various data using the communication function is completed.

For instance, when the recording of the music composition data using the audio function is completed, the determination at S200 is affirmed. Then, at S202, it is determined whether the speaker is set to the audio output prohibition state.

When the speaker is set to the audio output permission state, the event having occurred is notified via the speaker at S204. For example, a predetermined sound "ping-pong" is outputted via the speaker, and the processing once ends.

In addition, for instance, when the volume is set to zero (0) or to the mute state which prohibits audio output, it is determined that the speaker is set to the audio output prohibition state. At S206, the drive section 12 is instructed to vibrate the operation knob 11*a*. Therefore, the user can recognize the event having occurred by sensing the vibration of the operation knob 11*a* via own hand touching the operation knob 11*a*.

According to the above-mentioned configuration of the present fourth embodiment, when the control section 23 determines that the above event occurs and the speaker is set to the state to prohibit audio output, the control section 23 instructs the drive section 12 to vibrate the operation knob 11*a* to thereby notify a user of the event having occurred.

Fifth Embodiment

An in-vehicle display apparatus according to a fifth embodiment of the present application uses the communication device 24 as a reception circuit for the in-vehicle display apparatus to receive information transmitted from an outside. When the information transmitted from the outside is received via the communication device 24, the type of the received information is determined. Based on the determined type of the information, the drive section 12 is instructed to vary the vibration applied to the operation knob 11*a*.

Figure 8:
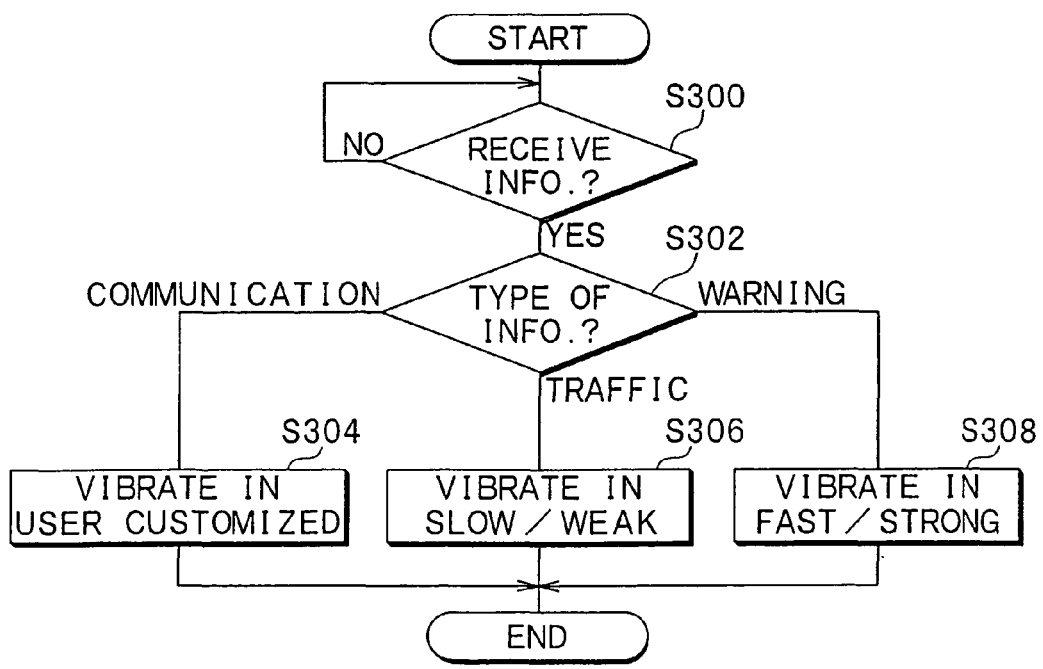
FIG. 8 is a flowchart illustrating a process executed by a control section according to a fifth embodiment of the present invention.

FIG. 8 shows a flowchart executed by the control section 23. When the ignition switch of the vehicle turns on and the control section 23 is thereby moved to an operation state, the control section 23 starts a process illustrated in FIG. 8.

First, at S300, it is determined whether any information is received from an outside via the communication device 24. For instance, information transmitted from the outside includes communication information about the guidance for facilities, traffic information such as congestion information and accident information, and warning information about safe travels.

Next, at S302, the type of the received information is determined. In detail, it is determined which information type among the above-mentioned communication information, traffic information, and warning information the received information belongs to.

When the type of the received information belongs to the communication information, at S304 the drive section 12 is instructed to vibrate the operation knob 11*a* in a manner customized by the user. When the type of the information received belongs to the communication information, it is designed that a user can customize the frequency and strength of the vibration applied to the operation knob 11*a* according to a display window in advance. Thus, the drive section 12 is instructed to vibrate the operation knob 11*a* in such a manner customized by the user, and the processing once ends.

In addition, when the type of the received information belongs to the traffic information, the drive section 12 is instructed to apply a slow-tempo and weak vibration to the operation knob 11*a* at S306. For instance, the drive section 12 is instructed to apply the vibration having a comparatively long cycle and weak strength to the operation knob 11*a*, and the processing once ends.

In addition, when the types of the received information are the warning information, the drive section 12 is instructed to apply the fast-tempo and strong vibration to the operation knob 11*a*. In detail, the drive section 12 is instructed to apply the vibration having a comparatively short cycle and strong strength to the operation knob 11*a*, and the processing once ends.

According to the above-mentioned configuration of the present fifth embodiment, when the information transmitted from the outside is received, the control section 23 instructs the drive section 12 to vibrate the operation knob 11*a* to thereby notify a user that information is received. Thus, the event having occurred can be reported more certainly.

In addition, the vibrating applied to the operation knob 11*a* is varied based on the types of the received information. The user can recognize the type of the received information by virtue of the vibration of the operation knob 11*a*.

In the present embodiment, when the information transmitted from the outside is received, the type of the received information is determined at S302. Based on the type of the information received, the drive section 12 is instructed to vary the application of the vibration to the operation knob 11*a* at S304 to S308. For example, the determination at S302 may be omitted. When the information transmitted from the outside is received, regardless of the type of the information, it may be designed that the drive section 12 is instructed to apply to the operation knob 11*a* the vibration having the constant strength and constant cycle.

Other Embodiments

In the above first to third embodiments, a position signal indicating the position of the operation knob 11*a* is sent out from the operation device 10 to the display control device 20. Then, the display control device 20 determines the display position of the cursor in the display window in conjunction with the position of the operation knob 11*a*, and then displays the cursor in the determined display position in the display window. Alternatively, it may be designed that the operation device 10 determines the display position of the cursor in the display window in conjunction with the position of the operation knob 11*a*.

Further, in the above first to fifth embodiments, the operation section 11 is configured such that the hemisphere-shaped operation knob 11*a* turns according to user's operation, as illustrated in FIGS. 2A, 2B. Without need to be limited to the above, the operation section 11 may be configured as another one.

Further, in the above first to fifth embodiments, a reactive force or vibration is generated or applied to the operation knob 11a using the drive section 12 which has several actuators. There is no need to be limited to such a configuration.

Further, in the above first to third embodiments, the detection circuit to detect the position of the operation knob 11a transmits a position signal to the display control device 20. In detail, the position signal represents the position (X coordinate and Y coordinate) of the operation knob 11a as an absolute value. Alternatively, for instance, the detection circuit can output a position signal indicating the position of the operation knob 11a as a relative value.

Furthermore, in the above embodiments, the drive section 12 may function as an example of a biasing (or force applying) means or section. The control section 23 may function at S104, S106, S108 as an example of a bias instruction means or portion (or a force application instruction means or portion). The control section 15 may function at S202 as an example of an audio output set determination means or portion. The control section 15 may function at S206, S304, S306, S308 as an example of a notification control means or portion. The control section 15 may function at S302 as an example of an information type determination means or portion.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer. Furthermore, the software portion or unit or any combinations of multiple software portions or units can be included in a software program, which can be contained in a computer-readable storage media or can be downloaded and installed in a computer via a communications network. It will be obvious to those skilled in the art that various changes may be made in the above-described embodiments of the present invention. However, the scope of the present invention should be determined by the following claims.

What is claimed is:

1. An in-vehicle display apparatus comprising:
an operation device including an operation knob which moves according to a user's operation; and
a display control device including a display section to display a display window,
the in-vehicle display apparatus displaying in the display section a cursor in association with a position of the operation knob, the cursor being used for selecting a set button selectable in the display window,
the operation device further including a force applying section configured for applying force to the operation knob according to an instruction from the display control device,
the display control device further including a storage section and a force application instruction portion,
the storage section being configured to store a map specifying that, with respect to the display window containing a set button display region where several set buttons including a maximum set button and a minimum set button are aligned in a line, a vibration is applied to the operation knob when the cursor is located on the minimum set button or the maximum set button,
the force application instruction portion being configured to
obtain, from the storage section, the map corresponding to the display window displayed in the display section, and
instruct the force applying section to apply the vibration to the operation knob when the cursor is located on the minimum set button or the maximum set button based on the acquired map,
wherein the map stored in the storage section further specifies that the vibration applied to the operation knob in case that the cursor is located on the maximum set button is larger than the vibration applied to the operation knob in case that the cursor is located on the minimum set button.

2. The in-vehicle display apparatus according to claim 1, wherein the map stored in the storage section further specifies that when the cursor moves between the set buttons displayed in the set button display region, a reactive force is applied to the operation knob such that the cursor remains on one of the set buttons before moving to an adjacent set button of the set buttons,
the force applying instruction portion being further configured to determine the vibration and the reactive force which are applied to the operation knob based on the map stored in the storage section, and
instruct the force applying section to apply the determined the vibration and the reactive force to the operation knob.

3. The in-vehicle display apparatus of claim 1, wherein the vibration applied to the operation knob in case that the cursor is located on the maximum set button notifies a user that a scroll cycle of the set buttons is completed.

4. The in-vehicle display apparatus of claim 1, wherein the vibration applied to the operation knob in case that the cursor is located on the maximum set button notifies the user that the cursor is located on the maximum set button, and the vibration applied to the operation knob in case that the cursor is located on the minimum set button notifies the user that the cursor is located on the minimum set button.

5. The in-vehicle display apparatus of claim 3, wherein there are at least three of the set buttons including the maximum set button and the minimum set button which are aligned in the line, and
the set buttons are cycled when scrolled.

6. The in-vehicle display apparatus of claim 4, wherein there are at least three of the set buttons including the maximum set button and the minimum set button which are aligned in the line, and
the set buttons are cycled when scrolled.

7. An in-vehicle display apparatus comprising:
an operation device including an operation knob which moves according to a user's operation; and
a display control device including a display section to display a display window,
the in-vehicle display apparatus displaying in the display section a cursor in association with a position of the operation knob, the cursor being used for selecting a set button selectable in the display window,
the operation device further including a force applying section configured for applying force to the operation knob according to an instruction from the display control device,
the display control device further including a storage section and a force application instruction portion, the storage section being configured to store a map specifying that, with respect to the display window containing a set button display region to display a series of set buttons in a line, when the cursor moves over the series of set buttons contained in the set button display region in one direction, a strength of a vibration applied to the operation knob is varied step by step in the one direction over the set buttons, the force applying section being configured to
obtain, from the storage section, the map corresponding to the display window displayed in the display section, and
instruct the force applying section to change the strength of the vibration applied to the operation knob step by step in the one direction over the set buttons when the cursor moves over the series of set buttons contained in the set button display region in the one direction.

8. The in-vehicle display apparatus according to claim 7, wherein the map stored in the storage section further specifies that when the cursor moves between the set buttons displayed in the set button display region, a reactive force is applied to the operation knob such that the cursor remains on one of the set buttons before moving to an adjacent set button of the set buttons, the force applying instruction portion being further configured to
determine the vibration and the reactive force which are applied to the operation knob based on the map stored in the storage section, and
instruct the force applying section to apply the determined vibration and reactive force to the operation knob.

9. The in-vehicle display apparatus according to claim 7, wherein
the vibration applied to the operation knob that is varied step by step notifies the user of a moving direction of the cursor over the series of set buttons.

10. An in-vehicle display apparatus to be used with an in-vehicle display device including a display section to display a window, the in-vehicle display apparatus displaying in the display section a cursor, the cursor being used for selecting buttons selectable in the display section, comprising:

an operation knob configured to
move in accordance with a user's operation, and
control a position of the cursor displayed in the display section;
a force applying section configured to apply a vibration and a reactive force to the operation knob, and
a storage section configured to store a map that specifies a plurality of degrees of the vibrations with respect to a plurality of buttons displayed in the display section, wherein:
a degree of the vibration specified to a button for a maximum value is larger than a degree of the vibration specified to a button for a minimum value;
when a user operates the operation knob to move the cursor to an adjacent button, the force applying section applies a predetermined fixed reactive force to the operation knob; and
when the operation knob is settled on a selected button by the user's operation, the force applying section applies the vibration to the operation knob in accordance with a degree of the vibration with respect to the selected button among the plurality of degrees of the vibrations specified by the map stored in the storage section.

* * * * *